(12) United States Patent
Libbrecht et al.

(10) Patent No.: US 12,277,044 B2
(45) Date of Patent: Apr. 15, 2025

(54) SYSTEM AND METHOD FOR REAL-TIME HARDWARE IN THE LOOP

(71) Applicant: Dana Belgium N.V., Flanders (BE)

(72) Inventors: Tony Libbrecht, Waregem (BE); Sam De Cock, Bruges (BE); Christophe De Buyser, Veldegem (BE)

(73) Assignee: DANA BELGIUM N.V., Bruges (BE)

( * ) Notice: Subject to any disclaimer, the term of this patent is extended or adjusted under 35 U.S.C. 154(b) by 57 days.

(21) Appl. No.: 18/310,370

(22) Filed: May 1, 2023

(65) Prior Publication Data

US 2024/0370343 A1 Nov. 7, 2024

(51) Int. Cl.
*G06F 11/00* (2006.01)
*G06F 11/10* (2006.01)
*G06F 11/273* (2006.01)
*H04L 12/40* (2006.01)

(52) U.S. Cl.
CPC ........ *G06F 11/273* (2013.01); *G06F 11/1004* (2013.01); *H04L 12/40* (2013.01); *H04L 2012/40215* (2013.01)

(58) Field of Classification Search
CPC ..... G06F 11/273; G06F 11/1004; H04L 12/40
USPC ...................................................... 714/1–57
See application file for complete search history.

(56) References Cited

U.S. PATENT DOCUMENTS

| 7,970,524 | B2 | 6/2011 | Gruenter |
| 8,156,475 | B2 | 4/2012 | Choi et al. |
| 9,235,727 | B2 | 1/2016 | Thomas et al. |
| 10,127,161 | B2 | 11/2018 | Wegner et al. |
| 11,061,745 | B2 | 7/2021 | Khandelwal et al. |
| 2011/0154094 | A1* | 6/2011 | Richardson ......... G06F 11/0793 717/125 |
| 2014/0123111 | A1 | 5/2014 | Lee et al. |
| 2015/0143332 | A1 | 5/2015 | Thomas et al. |
| 2016/0188396 | A1* | 6/2016 | Sonalker ............... G06F 11/079 714/37 |
| 2019/0235448 | A1 | 8/2019 | Banginwar et al. |
| 2019/0258251 | A1 | 8/2019 | Ditty et al. |
| 2022/0363277 | A1 | 11/2022 | Deckmyn et al. |

FOREIGN PATENT DOCUMENTS

| CN | 115407745 A | 11/2022 |
| DE | 102007031769 A1 | 1/2009 |
| DE | 102010043661 A1 | 5/2012 |

OTHER PUBLICATIONS

"Surface Vehicle Recommended Practice," SAE International, J-1939-76, Nov. 2018, 33 pages.

* cited by examiner

*Primary Examiner* — Sarai E Butler
(74) *Attorney, Agent, or Firm* — McCoy Russell LLP

(57) ABSTRACT

Methods and systems for building and operating a hardware-in-the-loop (HIL) system are described. In one example, executable instructions to model a controller, operate a controller area network (CAN) bus, and process analog signals are separated from executable instructions that simulate or model a physical system. The executable instructions are separated so that they may be executed via different computer cores so that a real-time process of the HIL system may not be interfered.

20 Claims, 6 Drawing Sheets

SYSTEM AND METHOD FOR REAL-TIME HARDWARE IN THE LOOP

TECHNICAL FIELD

The present disclosure relates to a method and system for applying hardware in the loop to evaluate whether or not a device under test may conform to behavioral requirements of a functional standard.

BACKGROUND AND SUMMARY

A vehicle system controller or other type of controller in a control system may include hardware and software for receiving inputs (e.g., inputs from sensors or other controllers) and controlling outputs (e.g., actuators) of a system. This hardware and software may strive to provide a desired level of functionality. Additionally, the vehicle system controller may provide control parameters and/or instructions for several other controllers to operate devices and sub-systems. For example, a vehicle system controller may issue commands to an electric machine controller to provide a propulsion torque under some vehicle operating conditions and a braking torque under other vehicle operating conditions. Further, the vehicle system controller may communicate with one or more controllers to determine whether or not the vehicle system controller or one of the other controllers is experiencing some sort of degradation (e.g., an inability or diminished capacity to perform an assigned task or function, such as monitoring a driver demand torque request).

In order to provide consistent and repeatable operation of devices and sub-systems, the vehicle controller may begin execution of certain controller executable instructions at fixed time intervals between the beginnings of executing the certain controller executable instructions (e.g., real-time time intervals). Execution of these controller executable instructions within a fixed time interval may be referred to as real-time control. In other words, the certain instructions start to be executed via the vehicle system controller each time a predetermined amount of time passes, and the execution of these certain instructions needs to be executed via the vehicle controller before the certain instructions begin to be executed again. For example, the vehicle system controller may execute instructions that take 20 micro-seconds to sense a pedal position and command torque of an electric machine based on the sensed pedal position each 25 milliseconds (e.g., the real-time interval). The amount of time it takes to execute the certain controller executable instructions (e.g., 20 micro-seconds) may not be determinative as to whether or not the controller is operating to provide real-time control, unless the amount of time it takes to execute the certain controller executable instructions exceeds the real-time defined time interval between when the certain controller executable instructions are to be executed (e.g., 25 milliseconds). If it takes longer to execute the certain controller executable instructions than the time interval for real-time control (e.g., 25 milliseconds), then the controller does not meet the real-time control criteria of executing the instructions within a predetermined real-time time interval (e.g., 25 milliseconds).

One way to verify that the controller meets prescribed real-time criteria is to couple the controller to a hardware-in-the-loop (HIL) simulation system. The HIL simulation system may emulate physical systems, inputs from actuators, and outputs from sensors that are both coupled to the physical systems (e.g., an engine, transmission, etc.). Further, the HIL may also emulate other controllers that are electrically coupled to the controller under test, which may be referred to as a device under test. The physical systems and the other controllers may be emulated via mathematical representations. However, the simulation of the physical systems and the other controllers may be so computationally intensive during some conditions that the hardware-in-the-loop simulation system cannot meet timing requirements to meet the real-time time interval (e.g., the time duration between executing the certain controller executable instructions to perform the real-time control). Therefore, it may be desirable to provide a way of meeting the real-time time interval via HIL systems that may include computationally intensive models and/or tasks.

The inventors herein have recognized the above-mentioned issues and have developed a hardware-in-the-loop system, comprising: a first computer core including a first group of executable instructions stored in non-transitory memory that include at least a first subset of executable instructions that execute repeatedly at a first time interval that is less than or equal to a predetermined real-time time interval; and a second computer core, the second computer core different than the first computer core and including a second group of executable instructions stored in non-transitory memory that include at least a second subset of executable instructions that execute repeatedly at a second time interval that is greater than the predetermined real-time time interval.

By separating executable instructions, actions, and/or tasks according to execution timing with respect to a predetermined real-time time interval, it may be possible to provide the technical result of meeting real-time control simulation metrics while simulating a system that is so computationally intensive that it may not meet real-time control simulation metrics. For example, executable instructions for simulation of a physical system such as an internal combustion engine that may not be executed within a real-time time interval (e.g., 5 milliseconds) may be separated from executable instructions for models and functions that may be executed within the predetermined real-time time interval so that a HIL system may reliably evaluate operation of a device under test. In particular, the executable instructions for simulating the physical system that may not be executed within the real-time time interval may be executed via a second computer core while executable instructions for models and functions that may be executed within the predetermined real-time timer interval may be executed via a first computer core. Such an arrangement may allow operation of the first computer core to not be influenced by operation of the second computer core and execution of the physical system simulation. As such, the first computer core may meet real-time time interval requirements so that the device under test may be evaluated according to real-time control practices without being subject to longer execution times that may result from the physical simulation.

The present description may provide several advantages. In particular, the approach may enable reliable evaluation of real-time control systems and components. In addition, the approach may allow a HIL system to be revised with less effort. Further, the approach may simplify HIL system updates for meeting revised performance standards.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 2:
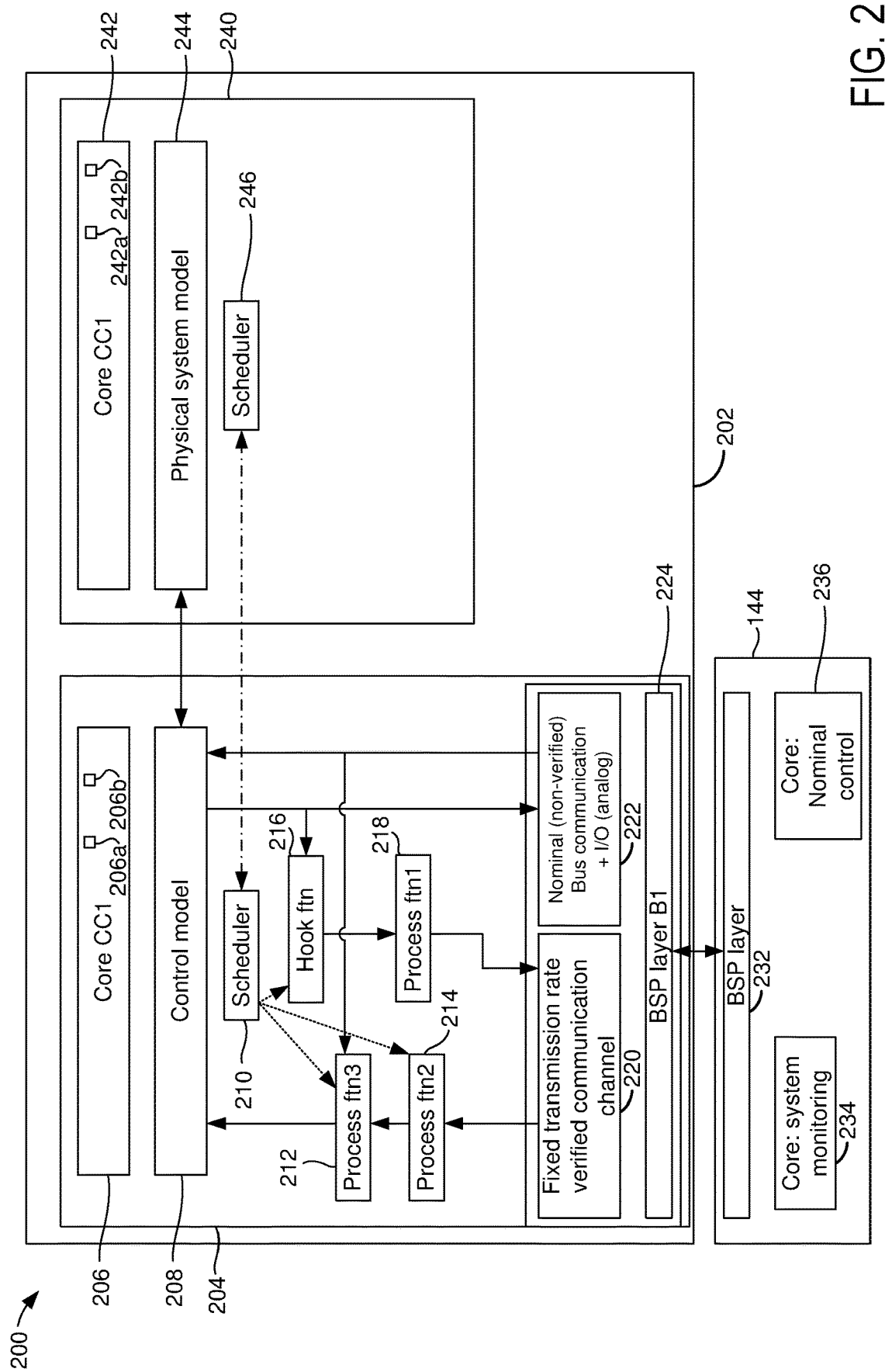
FIG. 2 shows a block diagram of an example HIL system that is coupled to the controller of FIG. 1.
Figure 3:
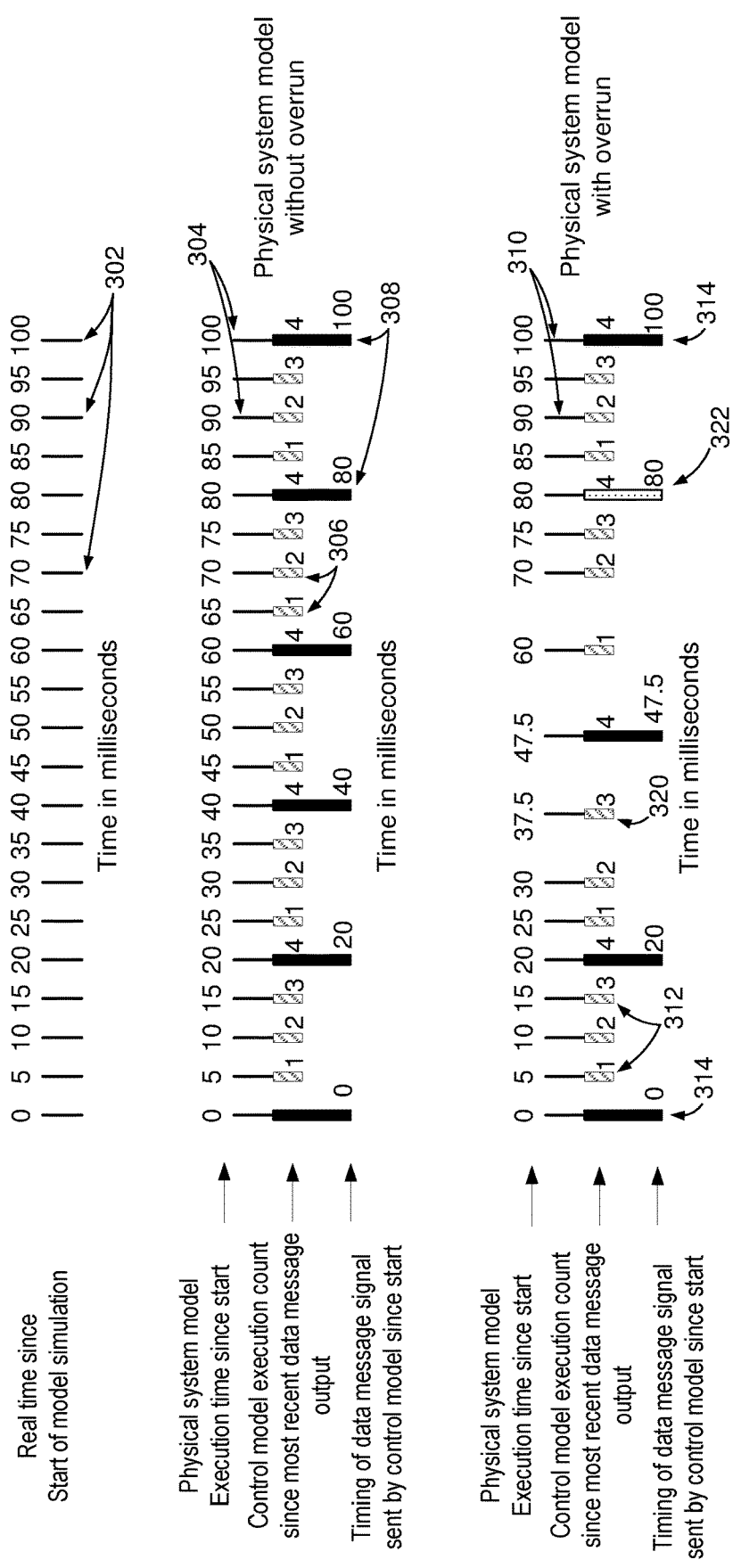
FIG. 3 shows an example sequence that illustrates some of the difficulties of evaluating real-time controls.
Figure 4:
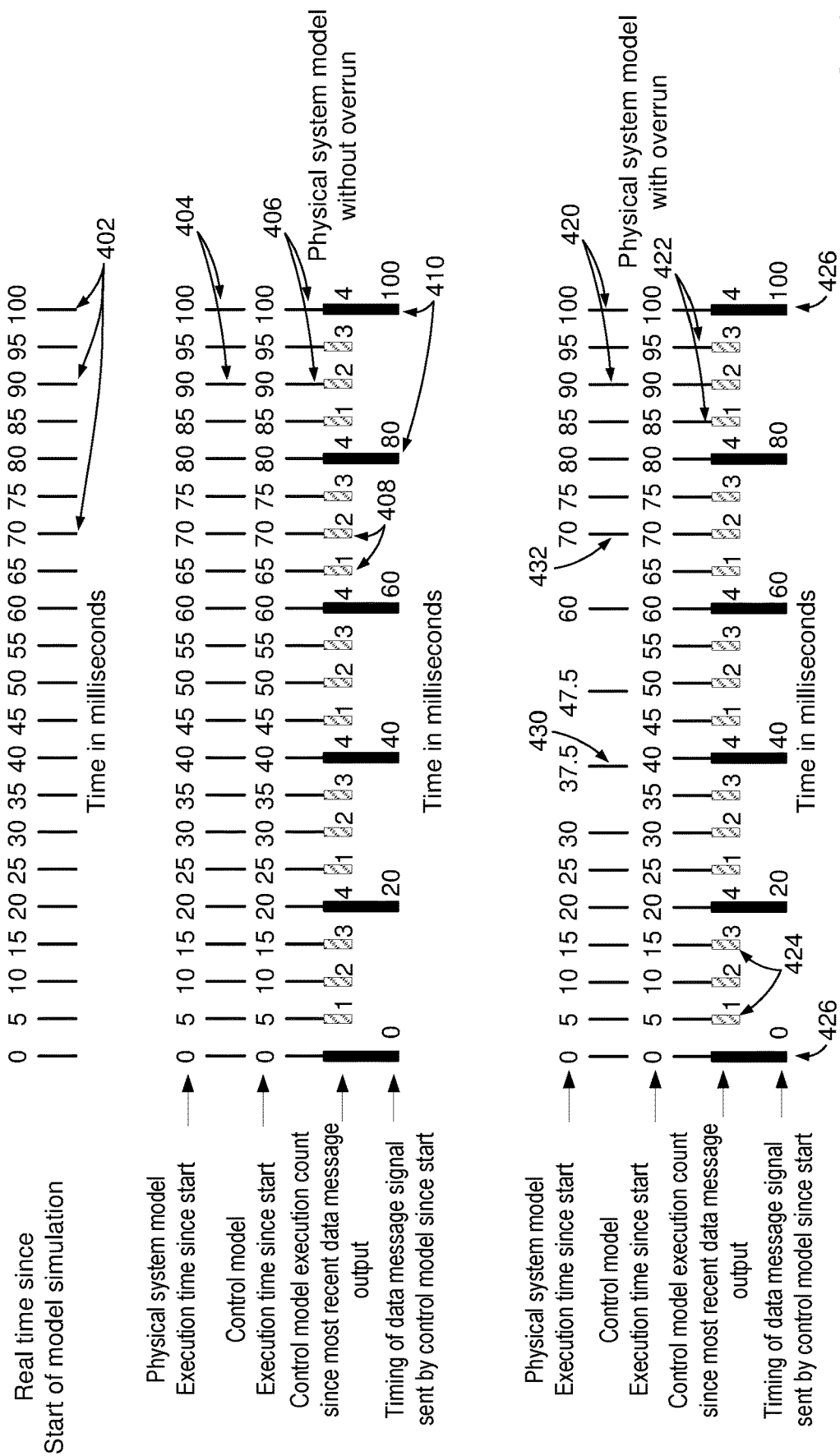
FIG. 4 shows an example sequence that illustrates how difficulties of evaluating real-time controls may be overcome.
Figure 5:
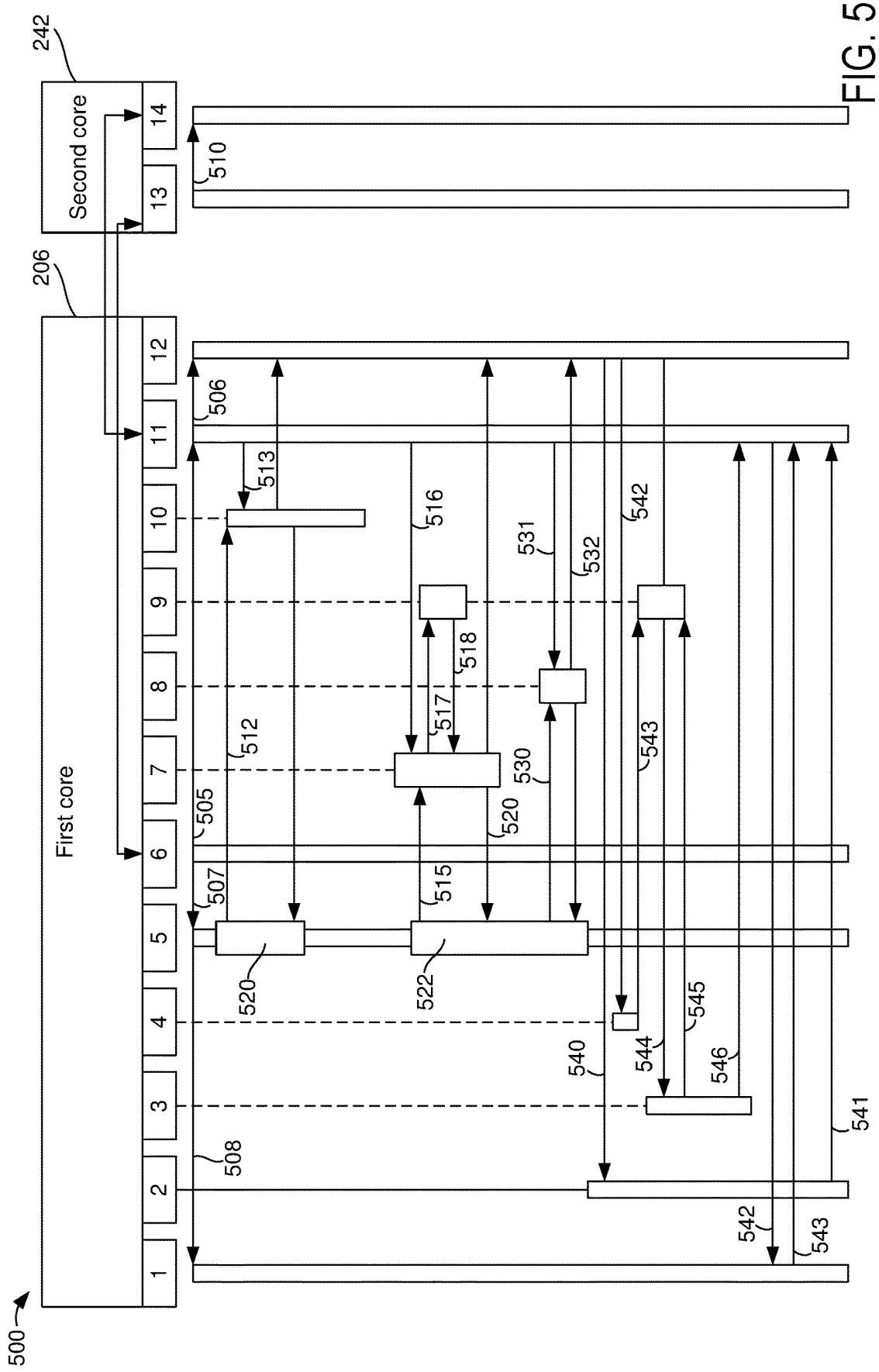
FIG. 5 shows a block diagram that illustrates data flow and sequence of operation for a HIL system.
Figure 6:
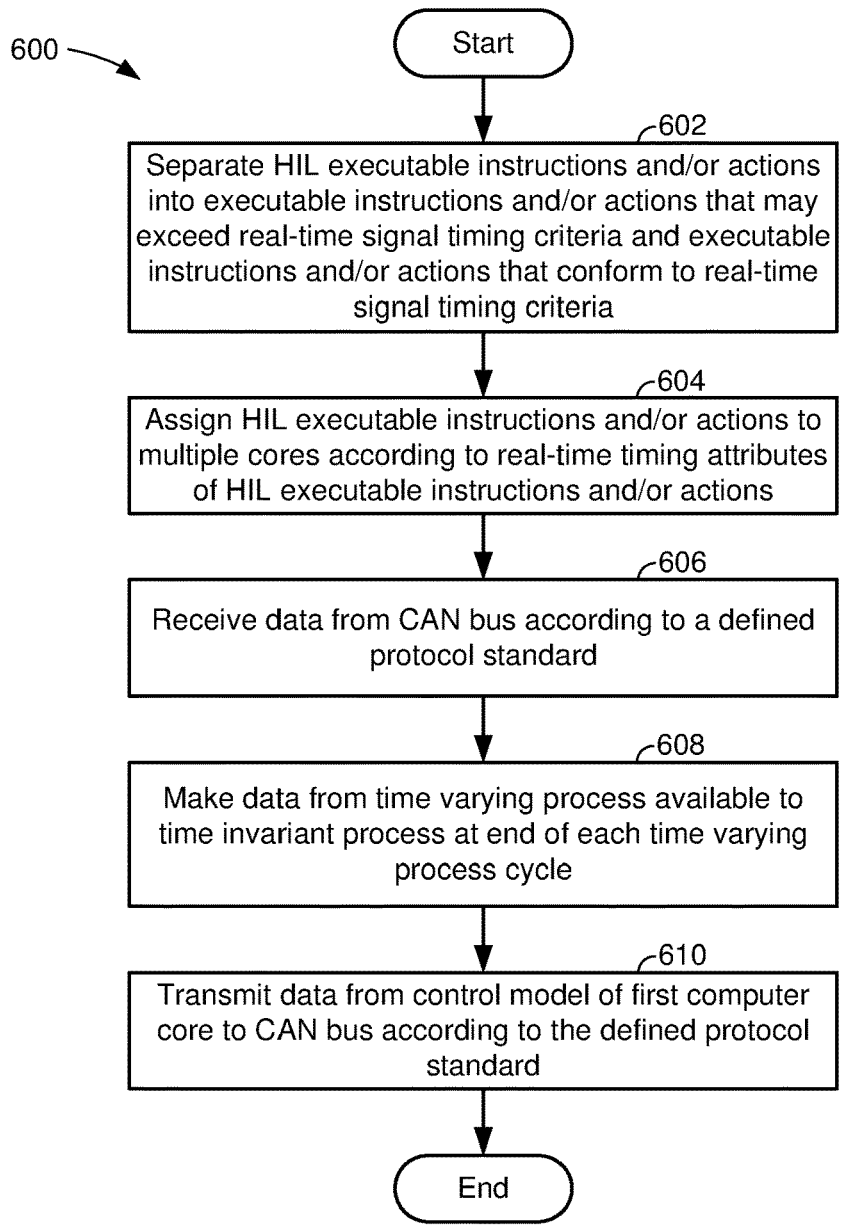
FIG. 6 shows example method for designing and operating a HIL system.

The following description relates to systems and methods for a HIL system that has a capacity to evaluate real-time control systems and components. In one example, the HIL may be applied to evaluate components and systems of a vehicle of the type shown in FIG. 1. The HIL system may be configured as shown in FIG. 2. A timing diagram for a hardware-in-the loop system that does not separate actions or tasks according to a predetermined real-time servicing frequency is shown in FIG. 3. A timing diagram for a hardware-in-the loop system that does separate actions or tasks according to a predetermined real-time servicing frequency is shown in FIG. 4. A block diagram that illustrates data flow and sequence of operation for a HIL system is shown in FIG. 5. Finally, a method for producing and operating a HIL system is shown in FIG. 6.

It is to be understood that the present disclosure may assume various alternative orientations and step sequences, except where expressly specified to the contrary. It is also to be understood that the specific devices and processes illustrated in the attached drawings, and described in the specification are simply exemplary embodiments of the inventive concepts disclosed herein. Therefore, specific dimensions, directions or other physical characteristics relating to the various embodiments disclosed are not to be considered as limiting, unless expressly stated otherwise.

It is within the scope of this disclosure, and as a non-limiting example, that the method and system for a HIL system may be applied in automotive, off-road vehicle, all-terrain vehicle, construction, and structural applications. As a non-limiting example, the method and system for building and operating a HIL system disclosed herein may also be used for evaluating control systems of passenger vehicles, electric vehicles, hybrid vehicles, commercial vehicles, and autonomous vehicles.

For description purposes, a sensor is optionally configured to be a physical device, a virtual device, or a combination of the two. For example, a physical device may be configured to provide data to a controller to form a parameter used in the controller.

Figure 1:
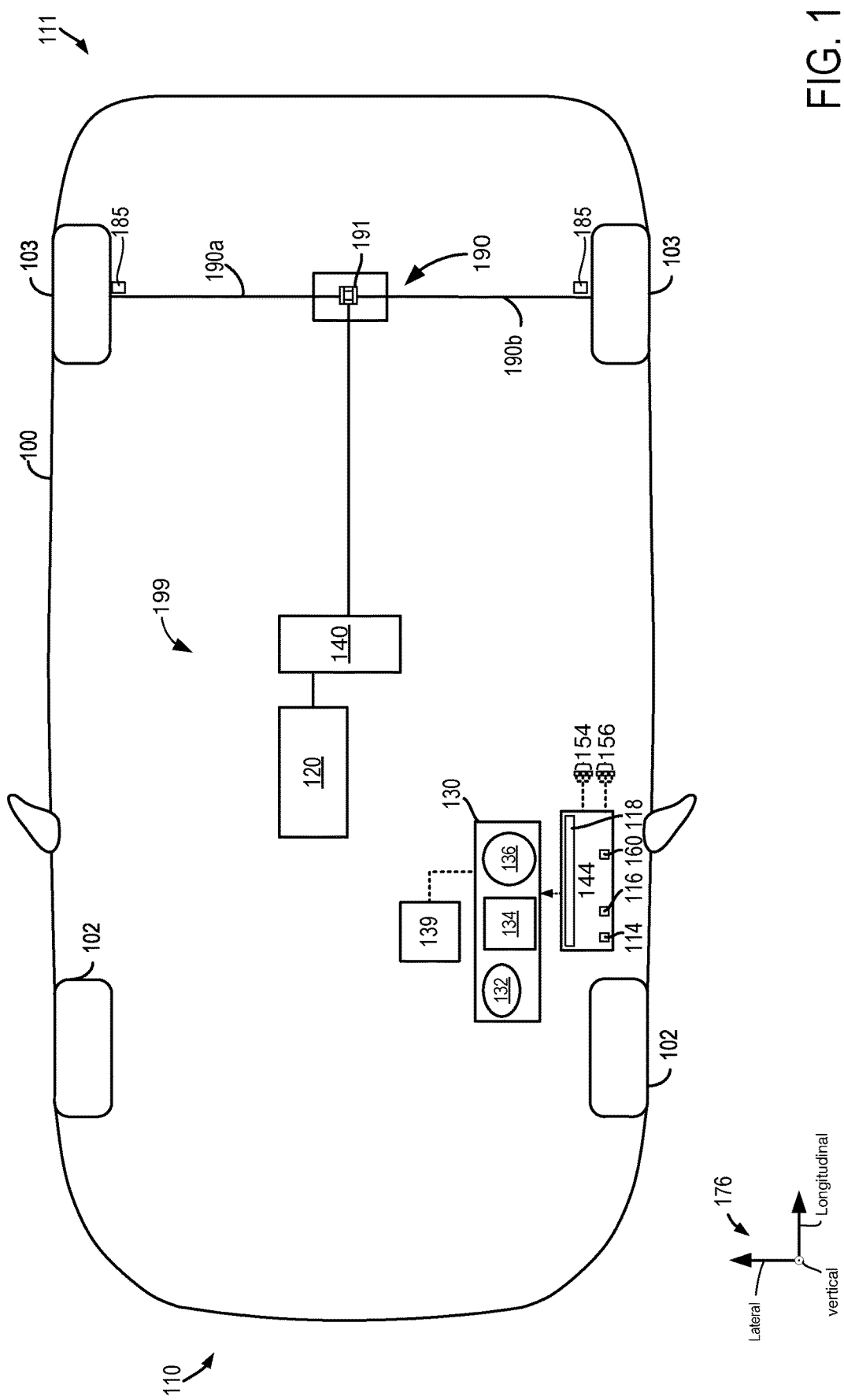
FIG. 1 is a schematic diagram of a system and its controller.

FIG. 1 illustrates an example vehicle driveline 199 included in vehicle 100. Mechanical connections are shown in FIG. 1 as solid lines and electrical connections are indicated as dashed lines.

Vehicle 100 includes a front side 110 and a rear side 111. Vehicle 100 includes front wheels 102 and rear wheels 103. In this example, vehicle 100 is configured as a two wheel drive vehicle; however, in other examples, vehicle 100 may be configured as a four wheel drive vehicle. Vehicle 100 includes a propulsion source 120 that may selectively provide propulsive effort to rear axle 190 and front axle 101. Propulsion source 120 may be an internal combustion engine (e.g., spark ignited or diesel), or alternatively, propulsion source 120 may be an electric machine (e.g., a motor/generator), or a combination thereof. Propulsion source 120 is shown mechanically coupled to gearbox 140, and gearbox 140 is mechanically coupled to rear axle 190. Propulsion source 120 may provide mechanical power to gearbox 140. Rear axle 190 may receive mechanical power from gearbox 140 so that mechanical power may be transmitted to rear wheels 103.

Rear axle 190 comprises two half shafts, including a first or right half shaft 190a and a second or left half shaft 190b. The rear axle 190 may be an integrated axle that includes a differential gear set 191. Differential gear set 191 may be open when vehicle 100 is traveling on roads and negotiating curves so that a right rear wheel may rotate at a different speed than a left rear wheel. Differential gear set 191 allows vehicle 100 to turn without dragging a right rear wheel or a left rear wheel.

Vehicle 100 includes controller 144 and controller 144 includes read-only memory (ROM or non-transitory memory) 114, random access memory (RAM) 116, a digital processor or central processing unit (CPU) 160, and inputs and outputs (I/O) 118 (e.g., digital inputs including counters, timers, and discrete inputs, digital outputs, analog inputs, and analog outputs). Controller 144 may receive signals from sensors 154 (including axle sensors, propulsion source temperature sensors, propulsion source speed sensors, etc.) and provide control signal outputs to actuators 156 (including propulsion source torque actuators, axle locking actuators, etc.). Controller 144 may communicate with dashboard 130, propulsion source 120, external controllers, external servers, and other controllers where present.

Vehicle 100 may also include a dashboard 130 that a human operator of the vehicle may interact with. Dashboard 130 may include an interactive navigation system 134 that generates and displays trip routes responsive to user input. Dashboard 130 may further include a display system 132 configured to display information to the vehicle operator. Display system 132 may comprise, as a non-limiting example, a touchscreen, or human machine interface (HMI), display which enables the vehicle operator to view graphical information as well as input commands. In some examples, display system 132 may be connected wirelessly to the internet (not shown) via controller 144. As such, in some examples, the vehicle operator may communicate via display system 132 with an internet site or software application (app) and controller 144. Dashboard 130 and devices included therein may be supplied with electrical power via battery 139. Battery 139 may also supply power to controller 144 and a starter motor (not shown) for propulsion source 120.

Dashboard 130 may further include an operator interface 136 via which the vehicle operator may adjust the operating status of the vehicle. Specifically, the operator interface 136 may be configured to initiate and/or terminate operation of the vehicle driveline (e.g., propulsion source 120) based on an operator input. Various examples of the operator interface 136 may include interfaces that utilize a physical apparatus, such as an active key, that may be inserted into the operator interface 136 to activate the propulsion source 120 and to turn on the vehicle 100, or may be removed to shut down the propulsion source 120 and to turn off the vehicle. Spatial orientation of vehicle 100 and vehicle axis are indicated via axes 176.

Turning now to FIG. 2, a block diagram 200 that includes a HIL system 202 for evaluating real-time control is shown. In this example, a controller 144 is electrically coupled to HIL system 202 for the purpose of evaluating whether or not controller 144 meets real-time control standards and objectives.

The HIL system 202 includes a first simulation model 204 that is comprised of a first computer core (e.g., computer processor) 206 including random access memory 206a and read-only memory 206b. The first simulation model 204 and the first computer core 206 may be associated with one or more modules (e.g., 204-224). The modules (e.g., 204-224) may be comprised of software (e.g., executable code) and/or hardware.

The modules of first simulation model 204 include a control model 208, a scheduler 210, a third process function 212, a second process function 214, a first process function 218, a hook function 216, a fixed transmission rate verified communications channel 220, a nominal bus communication channel 222, and a BSP layer module 224. The HIL system 202 includes a real-time operating system that schedules control model 208 (e.g., a first model) and physical system model 244 (e.g., a second model). The HIL system 202 may be applied to validate that the device under test (e.g., controller 144) conforms to its operating specifications. The control model 208 of the HIL system 202 is tasked to verify that the device under test meets its operating specifications, but execution of the physical model algorithm 244 may not interfere with the real-time operation of the control model 208 so that a useful verification of the device under test may be achieved. The architecture shown in FIG. 2 may reduce the possibility of execution of the physical system model 244 influencing the real-time performance of the control model 208.

The first simulation model 204 may communicate with the device under test via a board support package (BSP) layer 224 that may include software device drivers. The BSP layer 224 may include a controller area network (CAN) bus and analog signals. The BSP layer 224 interfaces solely with the control model 208. The BSP layer 224 provides realization of external access from control model 208 to the device under test (e.g., controller 144). The control model 208 is executed according to a trigger signal that is provided via scheduler 210. To realize verified bus communication between the device under test and control model 208, relevant data is captured from nominal bus communication (unverified) via hook function 216. The captured data may be processed via the first process function 218 and then reintegrated into the verified bus communication channel 220 for transfer to the device under test along with nominal (unverified) data exchange 222. To realize functional behavior bus communication from the device under test to the control model 208, relevant data from verified bus communication 220 may be processed by the second process function 214 and then delayed. After the delay, other relevant data from nominal (unverified) bus communication 222 may be processed by the third process function 212. After the second and third processes are executed, the processed data may be transferred to the control model 208. The control model may perform a variety of functions or actions including but not limited to simulating a controller (e.g., a transmission or engine controller), organize input and output data, and exchange data with the physical system model 244.

The HIL system 202 also includes a second simulation model 240 that is comprised of a second computer core 242 including random access memory 242a and read-only memory 242b. The second simulation model 240 and the second computer core 242 may be associated with one or more modules (e.g., 244-246). The modules (e.g., 204-224) may be comprised of software (e.g., executable code) and/or hardware.

The modules of second simulation model 240 include a physical system module 244 and a scheduler 246. The physical system module 244 may be an algorithm that models a physical system. The algorithm may be as simple as a lookup table that is referenced by one or more inputs (e.g., driver demand) and outputs an operating state of a physical system (e.g., engine torque). Alternatively, the algorithm may include many inputs that are processed via a linear or non-linear model and the model generates outputs to simulate the physical system.

Controller 144 is shown with a BSP layer 232 and a system monitoring section 234. System monitoring module 234 may be included in a second computer core of controller 144. Controller 144 also includes a nominal control module 236 that is included in a first computer core of controller 144.

Referring now to FIG. 3, an example timing sequence for a HIL system where executable computer instructions (e.g., models, software routines) and actions taken via the HIL system have not been separated into groups that meet the real-time time interval and groups that may not meet the real-time time interval is shown. In other words, the models, software routines, and actions taken via the HIL system are executed via a single computer core.

In this example, CAN bus data messages are to be sent at a predetermined timing of each 20 milliseconds, or a frequency of 50 Hertz, to establish a 20 millisecond real-time communication data rate exchange between the device under test and the HIL system. If the HIL system does not send a new message each 20 milliseconds, it may not reliably evaluate the real-time control of the device under test. Thus, the communications between the HIL system and the device under test may be used as a basis to determine whether or not the device under test is performing in real-time as may be expected. However, before evaluating the performance of the device under test, it may be desirable to confirm that the HIL system is performing real-time so that the device under test may be properly evaluated. In particular, simulation of some models (e.g., models of physical systems) in real-time where the HIL system operates with a single core may cause the HIL system performance to degrade below real-time performance. FIG. 3 illustrates one example of what may happen if a HIL system does not provide real-time performance.

FIG. 3 includes three plots where each plot begins at time 0 and time increases to a time of 100 milliseconds. The first plot from the top of FIG. 3 is a plot of real-time times since execution of the model began. The HIL system may be designed such that all executable instructions representing models of the HIL system (e.g., the control model and the physical model as shown in FIG. 2) are executed via a single core at the times indicated by the vertical lines 302 (e.g., the real-time time increments).

The second plot from the top of FIG. 3 is a plot that shows how the HIL system operates when there is no overrun (e.g., the amount of time it takes to execute the physical system simulation model instructions and update output states of the simulated physical system is less than the real-time time interval (5 milliseconds in this example)). For the second plot, real-time time since the HIL system begins model execution, start time for executing the physical model since time or HIL system start, control model execution count (e.g., an actual total number of times that the control model has executed since the most recent time the HIL sent a message to the device under test), and message data output are shown. All executable instruction models of the HIL system (e.g., the control model and the physical model as shown in FIG. 2) are executed via a single core at the times as indicated by the vertical lines 304. The numerical count of the number of times that the control model is executed since a most recent output of a data message is indicated near the hatched vertical lines as indicated at 306. Times when CAN messages are output via the HIL system to the device under test are output according to the filled vertical lines as indicated at 308.

The third plot from the top of FIG. 3 is a plot that shows how the HIL system operates when there is overrun in the physical model execution. For the third plot, real-time time since the HIL system begins model execution, start time for executing the physical model since time or HIL system start, control model execution count, and message data output are shown. All executable models of the HIL system are executed via a single core at the times as indicated by the vertical lines 310. The numerical count of the number of times that the control model is executed since a most recent output of a data message is indicated near the hatched vertical lines as indicated at 312. Times when CAN messages are output via the HIL system to the device under test are output according to the filled vertical lines as indicated at 314.

The real-time time begins at zero and it incrementally increases by 5 milliseconds until it reaches 100 milliseconds. Thus, the real-time interval in the example is 5 milliseconds, but it may be appreciated that other real-time intervals may be used. For a HIL system where there is no overrun of the physical model execution (the second plot from the top of FIG. 3), the control model and the physical model are executed each 5 milliseconds. The count of control model executions increments from a value of one to a value of four before it is reset and returns to a value of one. Each time the control model execution counter reaches a value of 4, the HIL system outputs a CAN message to the device under test. In other words, when the HIL system with a single core executing both the control model and the physical model does not overrun the real-time interval, a CAN message is output each 20 milliseconds as expected. For a HIL system where there is overrun of the physical model execution (the third plot from the top of FIG. 3), the control model and the physical model are executed at time intervals that vary, and some time intervals exceed the real-time 5 millisecond interval. Therefore, the count of control model executions increments at varying time intervals. In this example, the first time that execution of the control model and physical model overruns the real-time interval is indicated at 320. Therefore, the control count is delayed and the CAN bus message is delayed to 47.5 milliseconds from the desired 40 millisecond time. The CAN message that is output at 47.5 milliseconds is delayed by about 18%, which may be permissible for a given communication standard. However, execution of the physical model consumes even more time so that subsequent control model execution count values are delayed even further. This causes the next CAN bus message to be output at 80 milliseconds as indicated by the dot filled bar at 322. As such, there is a time delay of 80−47.5=32.5 milliseconds, which is about a 162% delay. Such a long delay may be determined to be an indication of real-time operational degradation. Yet, in this example, the inability to maintain real-time system operation is due to the HIL system. To avoid circumstances where the HIL system inadvertently affects the real-time system evaluation of the device under test, it may be desirable to construct a HIL system that meets the CAN message timing whether or not execution of the physical model exceeds the defined real-time time interval.

Moving on to FIG. 4, an example timing sequence for a HIL system (e.g., the system of FIGS. 2 and 5) where executable instructions (e.g., models, software routines) and actions taken via the HIL system have been separated into groups that meet the real-time interval and groups that may not meet the real-time time interval is shown. In other words, the models, software routines, and actions taken via the HIL system are executed via two or more computer cores. One of the computer cores executes the control model for interfacing with the device under test and simulating other controllers (e.g., executable instructions for tasks and models that execute fully and meet the real-time time interval) while a second computer core executes a simulation of a physical system (e.g., executable instructions for tasks and models that may not execute fully and may not meet the real-time time interval objectives). Operation of the first computer core and the second computer core may be synchronized, but the first computer core may execute its tasks (e.g., executing models, receiving and transmitting CAN messages, simulating other vehicle controllers, etc.) irrespective of when the second computer core fully executes one cycle of the physical model (e.g., receiving inputs to the model, calculating states of the physical model, and outputting states of the physical model).

In this example, CAN bus data messages are to be sent at a predetermined timing of each 20 milliseconds, or a frequency of 50 Hertz, to establish a 20 millisecond real-time communication data rate exchange between the device under test and the HIL system. If the HIL system does not send a new message each 20 milliseconds, it may not reliably evaluate the real-time control of the device under test. Thus, the communications between the HIL system and the device under test may be used as a basis to determine whether or not the device under test is performing in real-time as may be expected. However, before evaluating the performance of the device under test, it may be desirable to confirm that the HIL system is performing real-time so that the device under test may be properly evaluated. Specifically, it may be desirable to confirm that a HIL system that operates with a core that executes models that have varying execution time may meet real-time constraints. FIG. 4 illustrates how a HIL system with multiple computer cores may meet real-time performance criteria.

FIG. 4 includes three plots where each plot begins at time 0 and time increases to a time of 100 milliseconds. The first plot from the top of FIG. 4 is a plot of real-time since model execution begins. The HIL system may be designed such that the control model of the HIL system is executed via a first computer core independently from when a physical model simulation in the HIL is executed via a second computer core. The control model is executed at the times that are indicated by the vertical lines 402 (e.g., the real-time time intervals).

The second plot from the top of FIG. 4 is a plot that shows how the HIL system with multiple cores and with separated groups of executable instructions operates when there is no overrun condition. For the second plot, real-time time since the HIL system begins model execution, start time for executing the physical model since time or HIL system start, start time for executing the control model since time or HIL system start, control model execution count, and message data output are shown. The control model of the HIL system (e.g., the control model as shown in FIG. 2) is executed via a first computer core and the physical system model is executed via a second computer core. The start time of physical model execution is indicated by the vertical lines as shown at 404. The start time of control model execution is indicated by vertical lines as shown at 406. The numerical count of the number of times that the control model is executed since a most recent output of a data message is indicated near the hatched vertical lines as indicated at 408. Times when CAN messages are output via the HIL system to the device under test are output according to the filled vertical lines as indicated at 410.

The third plot from the top of FIG. 4 is a plot that shows how the HIL system with multiple cores and with separated groups of executable instructions operates when there is an overrun condition. For the third plot, real-time time since the HIL system begins model execution, start time for executing the physical model since time or HIL system start, start time for executing the control model since time or HIL system start, control model execution count, and message data output are shown. The control model of the HIL system (e.g., the control model as shown in FIG. 2) is executed via a first computer core and the physical system model is executed via a second computer core. The start time of physical model execution is indicated by the vertical lines as shown at 420. The start time of control model execution is indicated by vertical lines as shown at 422. The numerical count of the number of times that the control model is executed since a most recent output of a data message is indicated near the hatched vertical lines as indicated at 424. Times when CAN messages are output via the HIL system to the device under test are output according to the filled vertical lines as indicated at 426.

The real-time time begins at zero and it incrementally increases by 5 milliseconds until it reaches 100 milliseconds. Therefore, the real-time interval in the example is 5 milliseconds, but it may be appreciated that other real-time intervals may be used. For a HIL system where there is no overrun of the physical model execution (the second plot from the top of FIG. 4), the control model and the physical model are executed each 5 milliseconds. The count of control model executions increments from a value of one to a value of four before it is reset and returns to a value of one. Each time the control model execution counter reaches a value of 4, the HIL system outputs a CAN message to the device under test. In other words, when the HIL system with two cores executing the control model and the physical model on different cores and where overrun does not occur, a CAN message is output each 20 milliseconds as expected. For a HIL system where there is overrun of the physical model executing on the second computer core (the third plot from the top of FIG. 4), the control model is executed at a fixed rate (e.g., 5 milliseconds) and the physical model is executed at a varying time interval that sometimes exceeds the real-time 5 millisecond interval. Nevertheless, the count of control model executions increment as if there were no overrun by the physical model and the CAN bus message is output each 20 milliseconds. In this example, the first time that execution of the physical model overruns the real-time interval is indicated at 430 and the real-time interval is exceeded up to 70 milliseconds as indicated at 432. The control count is not delayed and since the CAN bus message is driven by the control count value, CAN bus messages are timely output such that the real-time criteria are met. Thus, separating executable instructions into a first group of instructions that meet the real-time time interval and a second group of instructions that may not meet the real-time time interval may allow the HIL system to meet real-time objectives.

Once it is established that the HIL system meets real-time objectives and/or criteria, the HIL system may be operated to purposefully inject or introduce a time delay into the sending of CAN bus messages to the device under test. Alternatively, the HIL system may be operated to purposefully inject or introduce CAN bus messages at a higher frequency than a specified CAN bus message frequency. The HIL system may introduce these anomalies to the CAN bus and device under test to evaluate the capacity of the device under test to recognize and notify other components of the system of the anomalies. Further, once the HIL has been established as meeting real-time operational criteria, it may possible to determine an amount of time it takes for the device under test to react to an anomalous stimulus (e.g., CAN bus message or analog input) that has been injected to the device under test to determine whether or not the device under test reacts in a timely manner.

If the HIL system is comprised of a single computer core and execution time of the physical system model may exceed the real-time servicing time, no conclusive indication of real-time control may be made in case the device under test is expected to indicate CAN bus message degradation. Additionally, if CAN bus messages sent by the HIL system do not conform to real-time criteria, the device under test may provide an indication (e.g., a variable changes value) that inhibits testing of other device under test features. For these reasons, it may be desirable to split executable instructions including models, logic, etc. into separate groups that may be executed by different computer cores.

Referring now to FIG. 5, a block diagram 500 illustrating how actions and/or tasks that may be performed via software (e.g., executable instructions) and/or hardware may be separated into groups that are associated with a specific computer core is shown. Block diagram 500 also illustrates how actions and/or tasks may be performed in sequence and how they may exchange data.

In this example, the first computer core 206 is assigned twelve actions or tasks 1-12. The first action and/or task 1 (analog signal handling processor) captures and converts analog signals from the device under test via an analog to digital converter into data that may be processed by the first computer core 206. Additionally, the first action and/or task 1 (analog signal processor) may generate analog signals via a digital to analog converter and send the analog signals to the device under test. The second action and/or task 2 (CAN bus non-verified received data handler) handles non-verified data that is received via the HIL system (e.g., 202 of FIG. 2) from the device under test. The third action and/or task 3 (CAN bus verified received data handler) handles verified message data that is received via the HIL system from the device under test. The fourth action and/or task 4 (CAN bus verified received header handler) handles verified header data that is received via the HIL system from the device under test. The fifth action and/or task 5 (CAN bus non-verified+verified transmit data handler) is a CAN bus transmit content handler. The sixth action and/or task 6 (first computer core control model scheduler) is a model scheduler that determines at what time the executable instructions are executed and what time the actions and/or tasks are performed. The seventh action and/or task 7 (CAN bus verified transmit header handler) prepares header data for transmitting data from the HIL system to the device under test. The eighth action and/or task 8 (CAN bus verified transmit data handler) prepares message data for transmitting data from the HIL system to the device under test. The ninth action and/or task 9 (CAN bus cyclic redundancy calculator) performs cyclic redundancy checks on data that is to be transmitted and data that is received. The tenth action and/or task 10 (CAN bus non-verified transmit data handler) handles transmission of non-verified data to from the HIL system to the device under test. The eleventh action and/or task 11 (control model) is the control model for the first computer core. The twelfth action and/or task 12 (electric CAN bus transmit/receive interface) is the hardware interface to the CAN bus.

The second computer core 242 includes two actions and/or tasks labeled 13 and 14. The thirteenth action and/or task 13 (second computer core model scheduler) is the model scheduler for the second computer core. The model scheduler schedules execution of the physical model. The fourteenth action and/or task 14 (physical model) is the physical model simulation.

The actions 1-14 may perform various operations that are indicated via arrows (e.g., 505-546) for the HIL system. For example, the HIL sequence of operation may begin by task 6 triggering (e.g., initiating) execution of task 11 (the control model) as indicated by arrow 505 and triggering execution of the hardware interface to the CAN bus 12 as indicated by arrow 506. Task 6 may also trigger execution of task 5 (the CAN bus transmit scheduler for non-verified+verified messages) as indicated by arrow 507. In addition, task 6 may also trigger execution of the analog signal electrical interface task 1 as indicated by arrow 508. The task 6 is cyclically repeated for each model step time (e.g., with a model step time of 5 milliseconds, task 6 repeatedly triggers the actions indicated by arrows 506-508). Similarly, the thirteenth action and/or task 13 model scheduler for the second computer core repeatedly triggers task 14 (the physical model) each step time of the model scheduler for the second computer core.

The HIL system may transmit non-verified messages by task 5 (the CAN bus transmit scheduler for non-verified+ verified messages) requesting task 10 (CAN bus transmit handler for non-verified messages) to collect data from task 11 (the control model) as indicated by arrows 512 and 513. Task 10 (the CAN bus transmit content hander) sends the data to transmit to task 12 (the hardware interface to the CAN bus) for broadcast. This cycle may be repeated according to setup of task 5 (the CAN bus transmit scheduler for non-verified+verified messages).

The HIL system may receive non-verified messages via task 2 (CAN bus non-verified received data handler) as indicated by arrow 540 from task 12. The received data is sent to task 11 (the control model) as indicated by arrow 541.

The HIL system may transmit verified messages by task 5 requesting task 7 (CAN bus verified transmit header handler) to collect data from the task 11 (control model) as indicated by arrow 515. Task 11 (the control model) sends the data to task 7 (CAN bus verified transmit header handler) as indicated by arrow 516. Task 7 (CAN bus verified transmit header handler) sends the data to transmit to task 9 as indicated by arrow 516 and task 9 performs a cyclic redundancy check on the data. Task 9 sends a check sum result back to task 7 as indicate by arrow 518. The header data including the check sum is then sent to task 12 (the hardware interface to the CAN bus) as indicated by arrow 519. A short time later, task 5 requests that that task 8 collect data from task 11 as indicated by arrow 530. Task 11 provides the data to task 8 as indicated by arrow 531. Task 8 sends task 12 the data as indicated by arrow 532. This cycle may be repeated according to setup of task 5 (CAN bus non-verified+verified transmit data handler).

The HIL system may also receive verified messages via task 4 (CAN bus verified received header handler) and task 3 (CAN bus verified received data handl) as indicated by arrows 542 and 544. The received header portion of the message is delivered to task 9 (the cyclic redundancy checker) as indicated by arrow 543 and stored. The received data portion of the message is delivered to task 9 (the cyclic redundancy checker) as indicated by arrow 545 and stored. Task 9 calculates a cyclic redundancy check value from the data message. Task 9 compares the message header cyclic redundancy check value with its value. If both values are equal to each other, the data was reliably communicated. If both values are not the same, a Boolean comparison result value is sent to task 11 (control model). The received data is sent to the controller as indicated by arrow 546.

The HIL system may also receive and transmit analog data. In particular, task 11 sends analog data values (e.g., digital data that represents an analog voltage) to task 1 (analog signal handling processor) as indicated by arrow 542, and task 1 (analog signal processor) outputs the analog value to the device under test. Analog inputs may be received via task 1 (analog signal processor), and task 1 (analog signal processor) sends digitized values that represent analog voltages to task 11 as indicated by arrow 543.

Additionally, it should be appreciated that verified CAN transmit may include hook function 216 of FIG. 2 may correspond to task 7 and task 8 of FIG. 5. Further, process function 218 corresponds to portions of task 7 and task 9. Verified CAN receive may include process 214, which corresponds to task 4, and process function 212, which corresponds to task 3.

Thus, the system of FIGS. 2 and 5 provides for a hardware-in-the-loop system, comprising: a first computer core including a first group of executable instructions stored in non-transitory memory that include at least a first subset of executable instructions that execute repeatedly at a first time interval that is less than or equal to a predetermined real-time time interval; and a second computer core, the second computer core different than the first computer core and including a second group of executable instructions stored in non-transitory memory that include at least a second subset of executable instructions that execute repeatedly at a second time interval that is greater than the predetermined real-time time interval. In a first example, the hardware-in-the loop system further comprises a device under test coupled to the hardware-in-the-loop system. In a second example that may include the first example, the hardware-in-the loop system includes where the predetermined real-time time interval is based on timing of execution of executable instructions stored in the device under test. In a third example that may include one or both of the first and second examples, the hardware-in-the loop system includes where the first group of executable instructions includes executable instructions that are configured to communicate with the device under test. In a fourth example that may include one or more of the first through sixth examples that may include one or more of the first through third examples, the hardware-in-the loop system includes where communicating with the device under test includes generating a data message and a header message. In a fifth example that may include one or more of the first through fifth examples, the hardware-in-the loop system includes where the header message includes cyclic redundancy check data for the data message. In a sixth example that may include one or more of the first through fifth examples, the hardware-in-the loop system includes where the second group of executable instructions is configured to simulate operating states of a physical system. In a seventh example that may include one or more of the first through sixth examples, the hardware-in-the loop system includes where the first subset of executable instructions also include instructions that cause the first computer core to communicate with a device under test via a controller area network at the rate that is an integer multiple of the real-time time interval.

The system of FIGS. 2 and 5 also provides for a hardware-in-the-loop system, comprising: a first computer core including a first group of executable instructions stored in non-transitory memory that include at least a first subset of executable instructions that execute repeatedly at a first real-time time interval that is less than or equal to a predetermined real-time time interval, the first computer core including a model scheduler configured to trigger execution of an analog signal input module, a controller area network (CAN) bus message data transmit handler module, a CAN bus cyclic redundancy module, a control module, and a CAN bus interface module; and a second computer core, the second computer core different than the first computer core and including a second group of executable instructions stored in non-transitory memory that include at least a second subset of executable instructions that execute repeatedly at second time interval that is greater than the predetermined real-time time interval. In a first example, the hardware-in-the-loop system further comprises a device under test coupled to the hardware-in-the loop system. In a second example that may include the first example, the hardware-in-the-loop system further comprises additional executable instructions stored in non-transitory memory to provide a CAN bus header transmit handler module. In a third example that may include one or both of the first and second examples, the hardware-in-the-loop system further comprises additional executable instructions that cause the hardware-in-the-loop system to send data to the CAN bus cyclic redundancy module and send data from the CAN bus cyclic redundancy module to the CAN bus header transmit handler module. In a fourth example that may include one or more of the first through third examples, the hardware-in-the-loop system further comprises additional executable instructions stored in non-transitory memory that cause the hardware-in-the-loop system to send a data message to the CAN bus interface module from the CAN bus message data transmit handler module.

Referring to FIG. 6, a flowchart of a method for constructing and operating a HIL system is shown. The method of FIG. 6 may be at least partially implemented as executable instructions stored in controller memory in the systems of FIGS. 2 and 5. Further, the method of FIG. 6 may include actions taken in the physical world to transform operating states of the system of FIGS. 2 and 5. In addition, in some examples, the method of FIG. 6 may be distributed amongst several controllers and one or more humans where each controller may perform a portion of the method.

At 602, executable instructions and/or actions of the HIL system are separated into executable instructions and/or actions that may exceed real-time signal timing criteria and executable instructions and/or actions that conform to real-time signal timing criteria. In one example, executable instructions and/or actions that may conform to real-time signal timing criteria may include executable controller instructions for the HIL system, CAN bus verified message handling, transmitting, and receiving, and analog signal input and output processing. Executable instructions and/or actions that may exceed real-time signal timing criteria may include models of physical systems (e.g., engines, transmissions, electric machines, etc.).

As an example, a particular standard for communications between one or more devices may require sending and/or receiving of CAN messages at a 20 millisecond interval. In order to reliably meet this timing, it may be determined that a system is to perform particular operations at a fixed time rate of 5 milliseconds. For example, as previously discussed, the HIL system may execute a control model, send messages via a CAN bus, and service analog inputs and outputs each 5 milliseconds. Thus, in this example, the real-time time interval is 5 milliseconds. If the CAN communication instructions, control model, and analog signal executable instructions and operations are determined to have a total time to execute of 2 milliseconds for the range of the HIL simulation, then the CAN communication instructions, control model, and analog signal executable instructions and operations may be separated from other instructions and/or actions that may not meet the real-time time interval of 5 milliseconds.

Executable instructions and/or actions that may not perform to meet the real-time time interval of 5 milliseconds may be separated into a second group of executable instructions and/or actions that may not meet real-time signal timing requirements. For example, if a model of an internal combustion engine receives inputs, computes engine states, and outputs engine states in 3 milliseconds when engine speed is simulated to be 600 revolutions/minute (RPM), but the same engine model takes 7 milliseconds to receive inputs, compute engine states, and output engine state when engine speed is simulated to be 2000 revolutions/minute (RPM), then the model of the internal combustion engine does not meet real-time signal timing requirements for a 5 millisecond real-time interval. Therefore, the executable instructions and/or actions to simulate the internal combustion engine are separated into a group of executable instructions and/or actions that may not meet real-time signal timing criteria.

By separating executable instructions and/or actions into these groups, it may be possible to design the HIL system in a way that may avoid the physical model of the engine (executable instructions and actions that may not meet real-time signal timing criteria) interfering with HIL system operations/actions that are needed to meet the real-time signal timing criteria. Method 600 proceeds to 604.

At 604, method 600 assigns the executable instructions and/or actions that meet real-time signal timing criteria to a first computer core that may execute these commands and/or perform these actions. Method 600 assigns the executable instructions and/or actions that may not meet real-time signal timing criteria to a second computer core that may execute these commands and/or perform these actions. It may be appreciated that although two computer cores are described in this example, executable instructions and/or actions may be assigned to more than two computer cores. Method 600 proceeds to 606.

At 606, method 600 the executable instructions and actions of the HIL system are executed including model execution and execution of the actions and/or tasks described in FIG. 5. In one example, a first scheduler in a first computer core executes instructions and actions that meet the real-time signal timing requirements. Further, a second scheduler in a second computer core executes instructions and actions that may not meet the real-time signal timing requirements. Method 600 proceeds to 608.

At 608, method 600 communicates states of the physical model that is simulated via the second computer core to the controller of the first computer core. If the physical model executes at a lower speed than the controller, states from the physical model are maintained at their respective values and accessible to the controller of the first computer core until the second computer core sends revised values to the controller of the first computer core. The executable instructions that have been assigned to the first computer core are executed at a previously determined real-time rate (e.g., each 5 milliseconds). The executable instructions that have been assigned to the second computer core are executed at the previously determined real-time rate or upon completing execution of the instructions when the execution time of the executable instructions exceeds the real-time rate. For example, if the real-time time interval between executing instructions is 5 milliseconds, but it takes 8 milliseconds to fully execute a physical model simulation, then the model executes each 8 milliseconds. Method 600 proceeds to 610.

At 610, method 600 transmits control model data from the first computer core to the CAN bus and the device under test according to a predefined protocol. For example, method 600 may send verifiable messages over the CAN each 20 milliseconds. Method 600 proceeds to exit.

In this way, executable instructions and/or actions and/or tasks of a HIL system may be separated into groups. The first group may be a group of executable instructions/actions/tasks that execute at a predetermined rate (e.g., the real-time time interval) and fully execute before the real-time time interval is exceeded. The second group of executable instructions/actions/tasks may execute at varying rates and the rate of execution may exceed the real-time time interval during some conditions. Data from the second group of executable instructions/actions/tasks may be delivered to the first computer core, but timing of operations of the first computer core are not influenced by execution of executable instructions by the second computer core.

The method of FIG. 6 provides for a method for a hardware-in-the-loop system, comprising: separating executable instructions that perform actions via the hardware-in-the-loop system into a first group of executable instructions and a second group of executable instructions, the first group of executable instructions including instructions that execute repeatedly at a first time interval that is less than or equal to a predetermined real-time time interval and the second group of executable instructions including instructions that execute repeatedly at a second time interval that is greater than the predetermined real-time time interval, the first group of executable instructions different than the second group of executable instructions; executing the first group of instructions via a first computer core; and executing the second group of instructions via the second computer core. In a first example, the method for the hardware-in-the-loop system includes where executing the first group of executable instructions causes the hardware-in-the loop system to communicate with a device under test via a controller area network. In a second example that may include the first example, the method for the hardware-in-the-loop system includes where the second group of executable instructions simulate operation of a physical system. In a third example that may include one or both of the first and second examples, the method for the hardware-in-the-loop system includes where the first group of executable instructions simulate operation of a controller. In a fourth example that may include one or more of the first through third examples, the method for the hardware-in-the-loop system includes where the predetermined real-time time interval is based on a frequency of communication with a device that is coupled to the hardware-in-the loop system. In a fifth example that may include one or more of the first through fourth examples, the method for the hardware-in-the-loop system includes where the first group of executable instructions includes executable instructions to receive data from a device under test, where the device under test is a controller that is external to the hardware-in-the-loop system. In a sixth example that may include one or more of the first through fifth examples, the method for the hardware-in-the-loop system includes where the first group of executable instructions also includes executable instructions to send data to the device under test.

Note that the example control and estimation routines included herein may be used with various HIL system configurations. The control methods and routines disclosed herein may be stored as executable instructions in non-transitory memory and may be carried out by the HIL system including the controller in combination with the various sensors, actuators, and other HIL hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessary to achieve the features and advantages of the examples described herein, but it is provided for case of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a first computer core including a first group of executable instructions stored in non-transitory memory that include at least a first subset of executable instructions that execute repeatedly at a first time interval that is less than or equal to a predetermined real-time time interval; and
a second computer core, the second computer core different than the first computer core and including a second group of executable instructions stored in non-transitory memory that include at least a second subset of executable instructions that execute repeatedly at a second time interval that is greater than the predetermined real-time time interval.

2. The system of claim 1, further comprising a device under test coupled to the system.

3. The system of claim 2, where the predetermined real-time time interval is based on timing of execution of executable instructions stored in the device under test.

4. The system of claim 2, where the first group of executable instructions includes executable instructions that are configured to communicate with the device under test.

5. The system of claim 2, where communicating with the device under test includes generating a data message and a header message.

6. The system of claim 5, where the header message includes cyclic redundancy check data for the data message.

7. The system of claim 1, where the second group of executable instructions is configured to simulate operating states of a physical system.

8. The system of claim 1, where the first subset of executable instructions also include instructions that cause the first computer core to communicate with a device under test via a controller area network at a rate that is an integer multiple of the predetermined real-time time interval.

9. A method for a system, comprising:
separating executable instructions that perform actions via a hardware-in-the-loop system into a first group of executable instructions and a second group of executable instructions, the first group of executable instructions including instructions that execute repeatedly at a first time interval that is less than or equal to a predetermined real-time time interval and the second group of executable instructions including instructions that execute repeatedly at a second time interval that is greater than the predetermined real-time time interval, the first group of executable instructions different than the second group of executable instructions;
executing the first group of instructions via a first computer core; and
executing the second group of instructions via a second computer core.

10. The method for the system of claim 9, where executing the first group of executable instructions causes the system to communicate with a device under test via a controller area network.

11. The method for the system of claim 9, where the second group of executable instructions simulate operation of a physical system.

12. The method for the system of claim 9, where the first group of executable instructions simulate operation of a controller.

13. The method for the system of claim 9, where the predetermined real-time time interval is based on a frequency of communication with a device that is coupled to the system.

14. The method for the system of claim 9, where the first group of executable instructions includes executable instructions to receive data from a device under test, where the device under test is a controller that is external to the hardware-in-the-loop system.

15. The method for the system of claim 14, where the first group of executable instructions also includes executable instructions to send data to the device under test.

16. A system, comprising:
a first computer core including a first group of executable instructions stored in non-transitory memory that include at least a first subset of executable instructions that execute repeatedly at a first real-time time interval that is less than or equal to a predetermined real-time time interval, the first computer core including a model scheduler configured to trigger execution of an analog signal input module, a controller area network (CAN) bus message data transmit handler module, a CAN bus cyclic redundancy module, a control module, and a CAN bus interface module; and
a second computer core, the second computer core different than the first computer core and including a second group of executable instructions stored in non-transitory memory that include at least a second subset of executable instructions that execute repeatedly at second time interval that is greater than the predetermined real-time time interval.

17. The system of claim 16, further comprising a device under test coupled to the system.

18. The system of claim 16, further comprising additional executable instructions stored in non-transitory memory to provide a CAN bus header transmit handler module.

19. The system of claim 18, further comprising additional executable instructions that cause a hardware-in-the-loop system to send data to the CAN bus cyclic redundancy module and send data from the CAN bus cyclic redundancy module to the CAN bus header transmit handler module.

20. The system of claim 16, further comprising additional executable instructions stored in non-transitory memory that cause a hardware-in-the-loop system to send a data message to the CAN bus interface module from the CAN bus message data transmit handler module.

* * * * *